United States Patent
Gao et al.

(10) Patent No.: US 8,516,126 B2
(45) Date of Patent: Aug. 20, 2013

(54) PROCESSING SIP MESSAGES BASED ON MULTIPLE CORES

(75) Inventors: Zhi Guo Gao, Beijing (CN); Zhiyong Liang, Beijing (CN); Wei Lu, Bejing (CN); Ling Shao, Beijing (CN); Zhe Xiang, Beijing (CN); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/422,946

(22) Filed: Apr. 13, 2009

(65) Prior Publication Data
US 2010/0077084 A1     Mar. 25, 2010

(30) Foreign Application Priority Data
Sep. 24, 2008    (TW) ................................ 97136711 A

(51) Int. Cl.
*G06F 15/16*     (2006.01)
*H04L 12/28*     (2006.01)

(52) U.S. Cl.
USPC ............ 709/227; 709/226; 370/389; 370/400

(58) Field of Classification Search
USPC ............. 709/223–229; 370/389, 400; 718/1, 718/100–106; 712/1–22
See application file for complete search history.

(56) References Cited

U.S. PATENT DOCUMENTS

| | | | |
|---|---|---|---|
| 6,678,735 B1 | 1/2004 | Orton et al. | 709/230 |
| 6,795,546 B2 * | 9/2004 | Delaney et al. | 379/229 |
| 7,039,710 B2 | 5/2006 | Khartabil | 709/227 |
| 2004/0243680 A1 | 12/2004 | Mayer | 709/206 |
| 2005/0038906 A1 * | 2/2005 | Banes et al. | 709/238 |
| 2006/0242300 A1 * | 10/2006 | Yumoto et al. | 709/226 |
| 2007/0076710 A1 * | 4/2007 | Khan | 370/389 |
| 2008/0080515 A1 * | 4/2008 | Tombroff et al. | 370/394 |
| 2008/0228926 A1 * | 9/2008 | Shiratzky et al. | 709/228 |
| 2008/0256224 A1 * | 10/2008 | Kaji et al. | 709/223 |
| 2008/0280623 A1 * | 11/2008 | Danne et al. | 455/453 |
| 2009/0271515 A1 * | 10/2009 | Iyengar et al. | 709/226 |
| 2009/0287846 A1 * | 11/2009 | Iyengar et al. | 709/242 |

FOREIGN PATENT DOCUMENTS

| | | |
|---|---|---|
| CN | 1945538 A | 4/2007 |
| WO | WO 2007131441 A1 * | 11/2007 |

OTHER PUBLICATIONS

Batteram et al., "SIP Message Prioritization and Its Applications" Bell Labs Technical Journal 11(1), 21-36 (2006).

* cited by examiner

*Primary Examiner* — Shirley Zhang
(74) *Attorney, Agent, or Firm* — Ido Tuchman; William J. Stock

(57) ABSTRACT

A method and an apparatus of processing Session Initiation Protocol (SIP) messages based on multiple cores. The method comprises: pre-parsing a received SIP message to obtain an identifier of the SIP message; dispatching SIP messages with the same identifier to the same core; and processing, on each core, SIP messages dispatched to the core by using related dedicated resources. The present invention relieves the resource contention and thus improves the utilization efficiency of computing resources of cores.

16 Claims, 4 Drawing Sheets

```
                              400
                                              ─405
            MESSAGE sip:user2@domain.com SIP/2.0
401 ─── Via: SIP/2.0/TCP user1pc.domain.com;branch=z9hG4bK776sgdkse
            Max-Forwards: 70
402 ─── From: sip:user1@domain.com;tag=49584
403 ─── To: sip:user2@domain.com
404 ─── Call-ID: asd88asd77a@1.2.4.4
            CSeq: 1 MESSAGE
            Content-Type: text/plain
            Content-Length: 18

Watson, come here.
```

PROCESSING SIP MESSAGES BASED ON MULTIPLE CORES

CROSS-REFERENCE TO RELATED APPLICATIONS

This application claims priority under 35 U.S.C. §119 to Taiwanese Patent Application No. 97136711 filed Sep. 24, 2008, the entire text of which is specifically incorporated by reference herein.

FIELD OF THE INVENTION

The present invention generally relates to multi-core technology and, in particular, to a method and an apparatus of processing SIP (Session Initiation Protocol) messages based on multiple cores.

BACKGROUND OF THE INVENTION

The emergence of the next generation network (NGN), which is a burgeoning network technology, brings about more functions and advantages to communication service and also significantly increases workloads of networks. However, since SIP application servers of the next generation network communication perform relatively poor, they cannot meet requirements of the NGN.

To improve the performance of the SIP application server, a high-performance SIP stack is essential. Multicore-based "scale-out" technology is one of ways to improve the SIP stack performance, which improves the SIP stack performance by increasing processing components. Multicore technology implements "scale-out" by integrating multiple complete computer cores within one processor, and multiprocessor technology implements "scale-out" by integrating multiple processors on a server. Additionally, each of multiple processors in multiprocessor technology may have one or more cores.

To improve the server performance by using multicore-based "scale-out" technology, problems of how to make full use of computing resources of each core and of how to minimize the interference and resource contention between cores should be solved. Traditional multicore-based "scale-out" technologies mainly comprise a design approach termed "pipeline", a design approach termed "go through" and so on.

FIG. 1 illustrates a schematic view of the go through design approach. As illustrated in FIG. 1, a SIP stack 100 is partitioned into several layers including a transport layer 101, a parsing layer 102, a transaction layer 103, a dialog/session layer 104, and an application layer 105. According to the go through design approach, each core performs functions of all layers of the SIP stack. In this approach, all cores need to share such resources as transaction table, session table, dialog table, timer, I/O queue, etc. when processing SIP messages. FIG. 6 illustrates respective schematic views of a transaction table, a session table and a dialog table, which transaction table, session table and dialog table are used for storing information needed for processing SIP messages, such as states of transaction, session and dialog and related SIP information. Timer and I/O queue are also resources needed for processing SIP messages. However, when a core is accessing shared resources such as transaction table, session table and dialog table (such as executing an operation of searching, creating, editing, or deleting), the resources will be locked, so other cores cannot access the resources and have to wait. Additionally, in case of a relatively large throughput of SIP messages, cores might have to wait to use timer I/O queue, etc. Therefore, there is the resource contention problem among cores. As the number of cores increases, the resource contention gets more serious so that the overall server performance cannot be effectively improved with the increase in the number of cores.

Similarly, there is also another approach, namely the pipeline design approach. As illustrated in FIG. 2, a SIP stack is also partitioned into several layers including a transport layer 101, a parsing layer 102, a transaction layer 103, a dialog/session layer 104 and an application layer 105. Then, each layer is allocated several cores. This pipeline design approach achieves "scale-up" to an extent, whereas it can hardly dynamically balance the workloads among layers. Therefore, it is hard to make full use of computing resources of each core. More importantly, when a certain layer (e.g. transaction layer 103) is allocated several cores, each core in this layer also need to share certain resources such as transaction table, session table, dialog table, timer, I/O queue, etc. However, when a core is accessing shared resources such as transaction table, session table and dialog table (such as executing an operation of searching, creating, editing, or deleting), the resources will be locked, so other cores cannot access the resources and have to wait. Additionally, in case of a relatively large throughput of SIP messages, cores might have to wait to use timer, I/O queue, etc. Therefore, similar to the go through design approach, the pipeline approach is subjected to the resource contention problem among cores.

Therefore, there is currently no satisfactory solution in the prior art.

SUMMARY OF THE INVENTION

In view of the situation described above, it is an object of the present invention to provide a method and an apparatus of processing SIP messages based on multiple cores, in order to relieve the resource contention among cores.

According to an aspect of the present invention, there is provided a method of processing SIP messages based on multiple cores, the method comprising: pre-parsing a received SIP message to obtain an identifier of the SIP message; dispatching SIP messages with the same identifier to the same core; and processing, on at least one core, SIP messages dispatched to the core by using related dedicated resources.

According to another aspect of the present invention, there is provided an apparatus of processing SIP messages based on multiple cores, the apparatus comprising: a SIP message pre-parsing unit configured to pre-parse a received SIP message to obtain an identifier of the SIP message; a SIP message dispatching unit configured to dispatch SIP messages with the same identifier to the same core; and a SIP message processing unit configured to process, on at least one core, SIP messages dispatched to the core by using related dedicated resources.

According to the present invention, SIP messages with correlation are identified by the obtained identifier of the SIP message, and SIP messages with the same identifier are dispatched to the same core. Additionally, related dedicated resources are provided for each core. Therefore, the possibility that multiple cores need to access the same shared resources when processing SIP messages concurrently is lessened, and the resource contention among cores is thus relieved.

In an embodiment, the related resources include the transaction table. In another preferred embodiment, the related resources further include one or more of the session table, dialog table, timer and I/O queue.

In a preferred embodiment, when the core has multiple hardware threads, SIP messages with the same identifier may further be dispatched to respective hardware threads of each core, and related dedicated resources are further allocated to each hardware thread within each core such that each hardware thread may process SIP messages by using dedicated resources allocated to itself. Therefore, the resource contention among respective hardware threads is relieved.

With the present invention, the resource contention is markedly lessened, and the utilization efficiency of computing resources of cores improved, and the better overall performance provided.

BRIEF DESCRIPTION ON THE DRAWINGS

The above-described and other aspects and advantages of the present invention will become more apparent from the following detailed description of embodiments of the present invention, when taken in conjunction with the accompanying drawings.

Like reference numerals are used to indicate like or similar components throughout the accompanying drawings, in which.

DESCRIPTION OF THE PREFERRED EMBODIMENTS

Hereinafter, description will be given to a method and an apparatus of processing SIP messages based on multiple cores with reference to the accompanying drawings and in terms of embodiments.

Figure 1:
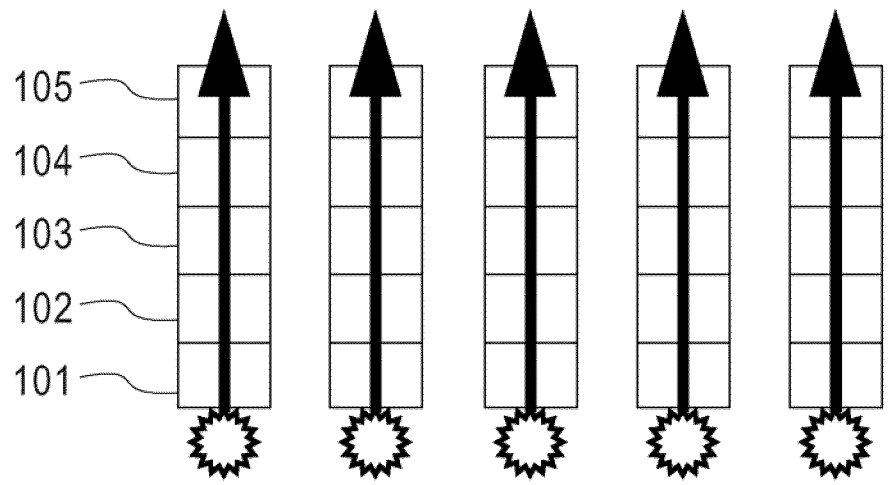
FIG. 1 illustrates a schematic principle view of the go through design approach according to the prior art.
Figure 2:
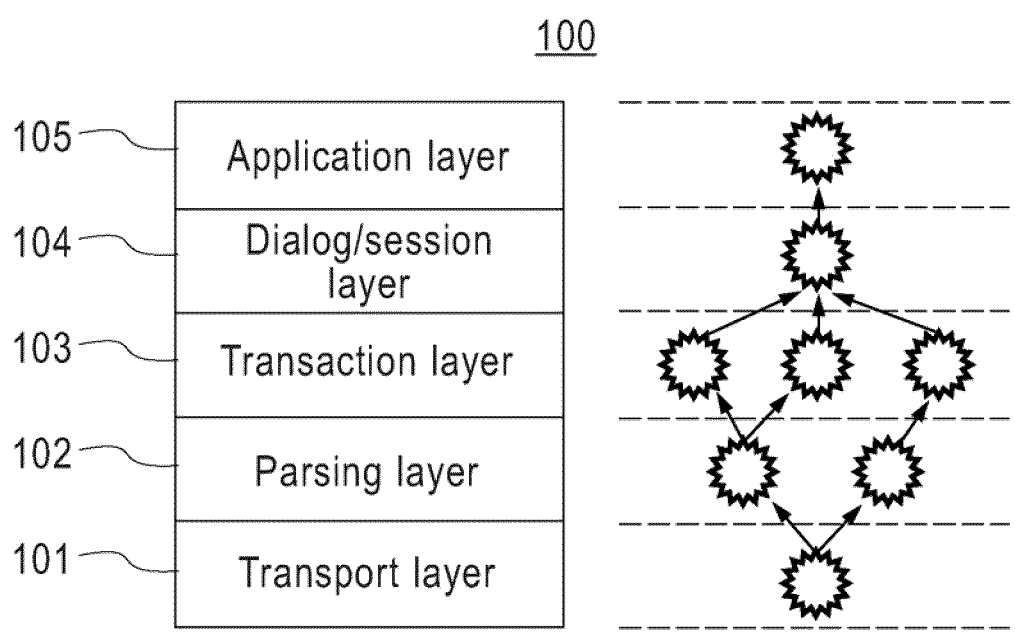
FIG. 2 illustrates a schematic principle view of the pipeline design approach according to the prior art.
Figures 3, 4:
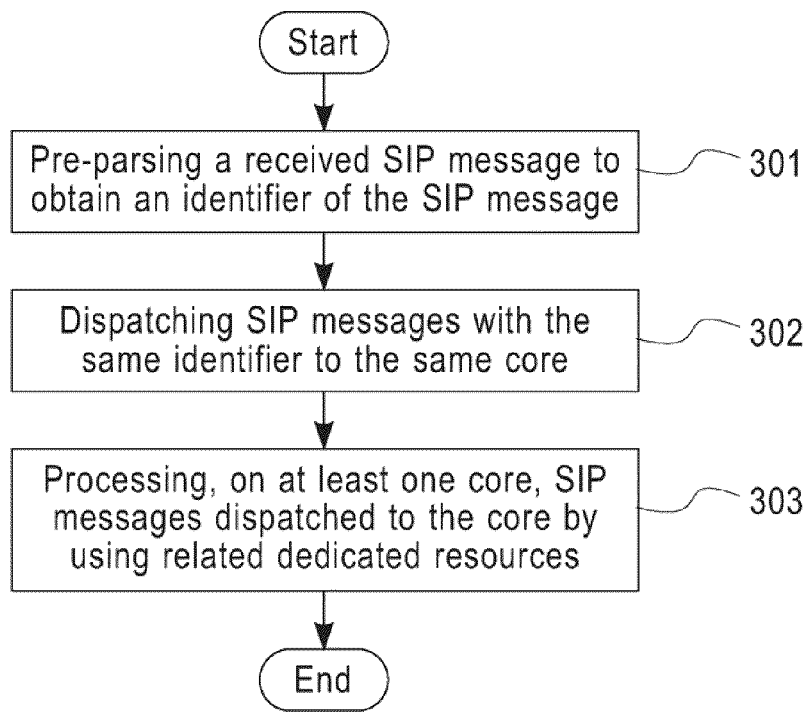
FIG. 3 illustrates a flowchart of a method of processing SIP messages based on multiple cores according to an embodiment of the present invention.
FIG. 4 illustrates a typical example of the structure of a SIP message.

Referring to FIG. 3, description will be given to a method of processing SIP messages of the present invention. FIG. 3 illustrates a flowchart of a method of processing SIP messages based on multiple cores according to an embodiment of the present invention.

In step 301, a received SIP message is pre-parsed in order to obtain an identifier of the SIP message. Usually, SIP messages may be transmitted through a user datagram protocol (UDP) or a transmission control protocol (TCP) for example. The received SIP message is often cached in a queue. When it is time to process the SIP message, the SIP message is retrieved from the queue. Then, the SIP message is pre-parsed to obtain the identifier of the SIP message. The identifier of the SIP message may be used to identify the correlation among SIP messages, and SIP messages with the same identifier are regarded as SIP messages having correlation. The identifier of the SIP message may be a dialogue identifier identifying which dialog the SIP message belongs to, a session identifier identifying which session the SIP message belongs to, a transaction identifier identifying which transaction the SIP message belongs to, and any other identifier capable of identifying the SIP message correlation. Detailed definitions of transaction, session and dialog are described in the IETF (Internet Engineering Task Force) RFC (Request for Comments) 3261. According to the description in SIP, a SIP transaction occurs between a client and a server and comprises all messages from the first request sent from the client to the server up to a final (non-1xx) response sent from the server to the client. If the request is INVITE and the final response is a non-2xx, the transaction also includes an ACK to the response. The ACK for a 2xx response to an INVITE request is a separate transaction. According the SDP specification, "A multimedia session is a set of multimedia senders and receivers and the data streams flowing from senders to receivers. A multimedia conference is an example of a multimedia session." (RFC 2327 [1]) (A session as defined for SDP can comprise one or more RTP sessions.) As defined, a callee can be invited several times, by different calls, to the same session. If SDP is used, a session is defined by the concatenation of the SDP user name, session id, network type, address type, and address elements in the origin field. In the definitions of the RFC3261, a dialog is a peer-to-peer SIP relationship between two UAs that persists for some time. A dialog is established by SIP messages, such as a 2xx response to an INVITE request. A dialog is identified by a call identifier, local tag, and a remote tag. If one dialog is established by an INVITE and a 200ok, subsequent re-invite, bye and other sessions belong to this dialog. For more information on dialog, session and transaction, please refer to the related description in the RFC3261.

The identifier of a SIP message may be obtained from the structure of the SIP message. A detailed description will be given below to the identifier of a SIP message with reference to FIG. 4.

FIG. 4 illustrates a typical example of the structure of a SIP message. As can be seen from the figure, a SIP message 400 comprises multiple header fields, including a "Via" field 401, a "From" field 402, a "To" field 403, a "Call-ID" field 404, etc. Among them, information in "From" field 402 represents the source address of the SIP message, information in "To" field 403 represents the destination address of the SIP message, and information in "Call-ID" field 404 represents the identifier of a call. Additionally, information in "Via" field 401 represents the transport used for the transaction and identifies the address to which a response will be sent. "Via" field 405 in the SIP message contains a "branch" parameter 405 which is used to identify a transaction created by a request, so this parameter may be used to differentiate transactions.

In an embodiment, the identifier of the SIP message is a triple consisting of respective information in "From" field 402, "To" field 403 and "Call-ID" field 404 in the SIP message structure. The triple identifies a dialog. In this embodiment, SIP messages belonging to the same dialog are regarded to have correlation. Therefore, the identifier formed by this triple may be used as a dialog identifier.

In another embodiment, the identifier of the SIP message is a quadruple consisting of respective information in "From" field 402, "To" field 403, "Call-ID" field 404, and "branch" parameter 405 in "Via" field 401 in the SIP message structure. The quadruple identifies a transaction. In this embodiment, SIP messages belonging to the same transaction are regarded to have correlation. Therefore, the identifier formed by this quadruple may be used as a transaction identifier.

It is to be understood to those of ordinary skill in the art that other fields can also be used to identify a session or any other possible SIP message in other embodiments.

Depending on an application situation, any one of a dialog identifier, a session identifier and a transaction identifier can be selected as the identifier of a SIP message to identify the correlation among SIP messages. For example, a dialog identifier or a session identifier may be used in order to prevent the resource contention as much as possible; or a transaction identifier may be used for the purpose of reducing the pre-processing overhead. Additionally, other ways may be used to form the identifier of a SIP message without departing from the spirit and scope of the present invention.

Then, SIP messages with the same identifier are dispatched to the same core in step 302.

In an embodiment, a core corresponding to the identifier of the SIP message obtained in step 301 is searched in a mapping table which records correspondences between identifiers of SIP messages and cores. Table 1 in the following illustrates an illustrative example that the mapping table identifies dialogs using the triple. In this table, the identifier of the SIP message is a dialog identifier which is a triple formed by respective information in the "From" field, the "To" field and the "Call-ID" field, and there are three cores for processing SIP messages, namely core 1, core 2 and core 3. All SIP messages identified by the same triple will be dispatched to the same core.

TABLE 1

| Identifier of SIP Message | | | |
| --- | --- | --- | --- |
| From | To | Call-ID | Core |
| user1@domain.com | user2@domain.com | asd88asd77a@1.2.4.4 | Core 1 |
| user2@domain.com | user3@domain.com | asd88asd77a@1.2.4.4 | Core 2 |
| user1@domain.com | user3@domain.com | ade34asd23a@1.2.4.4 | Core 3 |

If no identifier of the SIP message is found in the mapping table, this indicates that the SIP message is a new message, i.e. there is no SIP message related to the SIP message. In this case, a mapping from the identifier of the SIP message to a core is established in the mapping table for use by subsequent SIP messages related to the SIP message. Subsequently, the SIP message is dispatched to the core. On the other hand, if a core corresponding to the identifier of the SIP message is found, then the message is dispatched to the found core.

In another embodiment, allocation is implemented directly without using the mapping table described above. In this embodiment, a simple hash approach is employed. First, a corresponding integer value is calculated from the SIP message's identifier obtained in the pre-parsing. Then, this value modulo the number of cores and the SIP message is dispatched according to the remainder. This calculation operation may be performed according to the following expression:

R Mod F ID N wherein "R" represents the resulting remainder, "ID" is the SIP message's identifier, F is a function for calculating the integer value corresponding to the SIP message's "ID", N is the number of cores for processing SIP messages, and the function MOD (para1, para2) is for returning the remainder obtained when para1 is divided by para2.

For example, in the case where there are four cores, namely core 1, core 2, core 3 and core 4, the value F (ID) corresponding to the identifier of the SIP message, which is obtained according to the function F, modulo the number of cores, 4. SIP messages with the remainder of 1 are all dispatched to core 1, SIP messages with the remainder of 2 are all dispatched to core 2, SIP messages with the remainder of 3 are all dispatched to core 3, and SIP messages with the remainder of 0 are all dispatched to core 4. In this way, there is no need to use a mapping table to record correspondences between identifiers and cores.

Additionally, a hash approach in other way or other approach for directly allocating SIP messages can be employed. During dispatching SIP messages, for example, in establishing the above-described mapping or directly dispatching SIP messages, load balancing approaches that are well known in the art, such as polling, random and weighted polling, may be employed to balance workloads of respective cores. In step 303, SIP messages dispatched to each core are processed with related dedicated resources on the core. The processing may be implemented using the SIP message processing in the prior art.

In an embodiment, related dedicated resources allocated to each core comprise a transaction table. In another embodiment, the related dedicated resources further comprise one or more of transaction table, dialog table, timer and I/O queue. A dedicated transaction table, session table or dialog table stores information needed for processing SIP messages, such as the state of a transaction, session or dialog, a related SIP message, etc. since information needed for processing SIP messages are all stored in related dedicated resources of a core's own, when a core needs information related to a SIP message which it is processing, this core only needs to access these dedicated resources without having to access resources of other cores. Furthermore, a core may also use a dedicated timer and I/O queue without having to share them with other cores. In this way, the need for accessing shared resources is reduced, and the resource contention among cores is relieved, and the utilization efficiency of computing resources of cores is thus improved.

When the transaction identifier is employed, since SIP messages belonging to the same transaction are processed within the same core, the related dedicated resources include the transaction table. The related information of other SIP messages belonging to the same transaction can be searched with the dedicated transaction table of each core.

When the session identifier or dialog identifier is employed, SIP messages belonging to the same dialog or the same session are processed within the same core, at which point the related information of SIP messages belonging to the same session or dialog can be searched with the transaction table. Additionally, the related dedicated resources further include the session table or dialog table with which searching of related information of SIP messages belonging to the same session or dialog can be performed.

Depending on application needs, the related dedicated resources may include one or more of the timer and I/O queue, in order to further improve the processing speed of SIP messages.

The main idea of the present invention is to dispatch SIP messages with correlation to the same core so as to prevent multiple cores from accessing the same shared resource (e.g. the transaction table) at the same time. To this end, pre-parsing is performed prior to processing SIP messages such that SIP messages with correlation are dispatched into the same core for processing. Therefore, the possibility that multiple cores need to access the same part of shared resources when processing SIP messages with correlation concurrently is greatly lessened, and thus the resource contention is relieved and the utilization efficiency of computing resources of cores is thus improved. Furthermore, a micro-benchmarking test shows that 400,000 SIP messages can be pre-parsed every minute on the Thinkpad 1.6 G Pentium M processor. It is seen that pre-parsing is only a lightweight task and hardly increases any load of processor's. Therefore, the overall performance is significantly improved.

Therefore, the present application can be used to improve the pipeline design approach, the go through design approach or any other existing multi-core design approach. Specifically, when the present invention is used to improve the pipeline design approach, it can reduce the possibility that multiple cores on the same layer need to access the same shared resources when processing SIP messages with correlation concurrently. When the present invention is used to improve the go through design approach, it can lessen, as a whole, the possibility that multiple cores need to access the same shared resources when processing SIP messages with correlation concurrently.

The SIP message pre-parsing and SIP message dispatching may be implemented by a dedicated core or a core used for processing SIP messages. For example, under the environment where there is a relatively large data throughput, preferably the SIP message pre-parsing and SIP message dispatching is implemented by a dedicated core such that the pre-processing speed of SIP messages can be improved. Where there is not a larger data throughput, preferably the SIP message pre-parsing and SIP message dispatching is implemented by a core used for processing SIP messages. In this case, since the data throughput is not larger and the SIP message pre-processing is a lightweight task, the SIP message processing will not be affected and computing resources of cores are fully utilized. Additionally, the SIP message pre-parsing and SIP message dispatching may be implemented by dedicated design hardware, such as the NP (Network Processor), TOE (TCP Offload Engine), etc.

In another preferred embodiment, the core supports multi-thread technology. That is, there are multiple physical hardware threads in the core. In this embodiment, SIP messages with correlation are dispatched to the same hardware thread of the same core so as to be processed on the hardware thread of the core, and each hardware thread within each core has its own related dedicated resources such as one or more of the transaction table, session table, dialog table, timer, I/O queue, etc. In this way, SIP messages may be processed on the hardware thread with the dedicated resources of each hardware thread. As a result, the resource contention is further relieved, and the utilization efficiency of computing resources of cores is thus improved.

Figure 5:
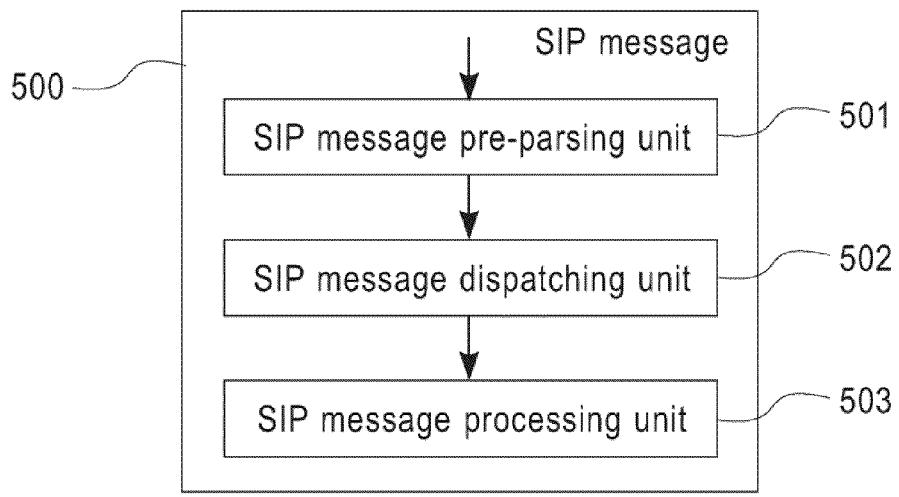
FIG. 5 illustrates a block diagram of an apparatus of processing SIP messages based on multiple cores according to an embodiment of the present invention.
Figure 6:
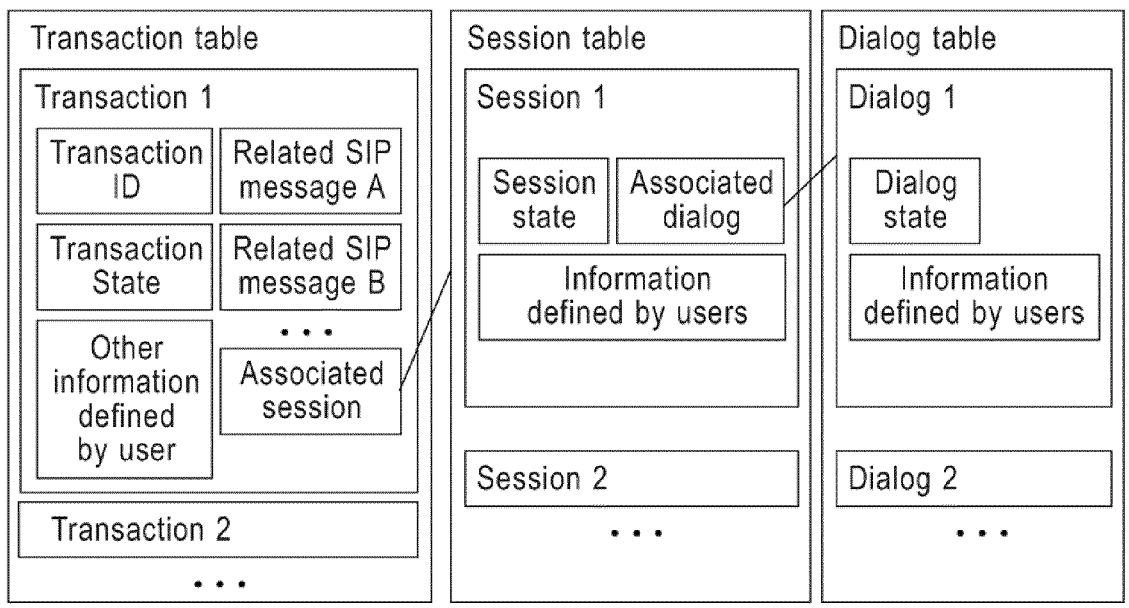
FIG. 6 illustrates respective schematic views of a transaction table, session table and dialog table.

FIG. 5 illustrates an apparatus of processing SIP messages based on multiple cores according to an embodiment of the present invention. As illustrated in FIG. 5, a SIP message processing apparatus 500 comprises a SIP message pre-parsing unit 501, a SIP message dispatching unit 502 and a SIP message processing unit 503.

SIP message pre-parsing unit 501 is configured to pre-parse a received SIP message in order to obtain the identifier of the SIP message, such as a dialog identifier, session identifier, transaction identifier or other identifier capable of identifying the correlation of the SIP message.

SIP message dispatching unit 502 is configured to dispatch SIP messages with the same identifier to the same core. In an embodiment, SIP message dispatching unit 502 searches a core corresponding to the obtained identifier of the SIP message in a mapping table which records correspondences between identifiers of SIP messages and cores. If the corresponding core is found, then the SIP message is dispatched to the found core; if not, then a mapping from the identifier of the SIP message to a core is established, and the SIP message is dispatched to the core.

In another embodiment, SIP message dispatching unit 502 implements direct dispatching described previously. In this embodiment, a simple hash approach is employed. SIP message dispatching unit 502 first calculates a corresponding integer value from the SIP message's identifier obtained in the pre-parsing, and then the integer value modulo the number of cores, and finally the SIP message is dispatched according to the remainder.

SIP message dispatching unit 502 may employ a hash approach in other way or other approach for directly allocating SIP messages. During dispatching SIP messages, for example, in establishing the above-described mapping or directly dispatching SIP messages, SIP message dispatching unit 502 may balance workloads of respective cores using load balancing approaches that are well known in the art, such as polling, random, weighted polling, etc.

SIP message processing unit 503 is configured to process SIP messages dispatched to each core by using related dedicated resources on the core. SIP message processing unit 503 may be implemented by the pipeline design approach or go through design approach in the prior art. In an embodiment, the related dedicated resources include the transaction table. In another preferred embodiment, the related dedicated resources may further include one or more of the session table, dialog table, timer and I/O queue. Therefore, dedicated resources may be used to process SIP messages, which lessens the resource contention among cores and improves the utilization efficiency of computing resources of cores.

In an embodiment, SIP message pre-parsing unit 501 and SIP message dispatching unit 502 may be implemented by a dedicated core or share a core used for the message processing unit. For example, under the application environment where there is a relatively large data throughput, SIP message pre-parsing unit 501 and SIP message dispatching unit 502 are preferably implemented by a dedicated core such that SIP message pre-parsing and dispatching may be performed using the dedicated core and other cores are used to process SIP messages. Therefore, the overall processing speed of SIP messages can be improved. Where there is not a large data throughput, SIP message pre-parsing unit 501 and SIP message dispatching unit 502 are preferably implemented by a shared core. In this case, since the data throughput is not large and SIP message pre-parsing is a lightweight task, SIP message processing will not be affected and computing resources of cores can be fully utilized.

In another embodiment, SIP message pre-parsing unit 501 and SIP message dispatching unit 502 may further be implemented by dedicated design hardware such as the NP, TOE, etc.

In another preferred embodiment, when the core has multiple hardware threads, SIP message dispatching unit 502 may further be configured to dispatch SIP messages with the same identifier to the same hardware thread within the same core, and SIP message dispatching unit 503 may further be configured to process, on the hardware thread within the core, SIP messages dispatched to the hardware thread by using related dedicated resources of the hardware thread. In this way, SIP messages with correlation are dispatched to the same hardware thread within the same core and are processed by using dedicated resources. Therefore, the resource contention among hardware threads is lessened.

As is clear from the embodiments of the SIP message processing apparatus, the SIP message processing apparatus of the present invention dispatches SIP messages with correlation to the same core and processes these SIP messages with related dedicated resources. Therefore, the resource contention is lessened, the utilization efficiency of computing resources of cores is improved, and the relatively fine overall performance is provided.

It is to be understood that the SIP message processing apparatus of the present invention may be a SIP application server or other apparatus for processing SIP messages.

It is also to be understood that the present invention may be implemented not only in a multi-core structured processor but also in a multiprocessor structure consisting of single-core processors.

Figure 7:
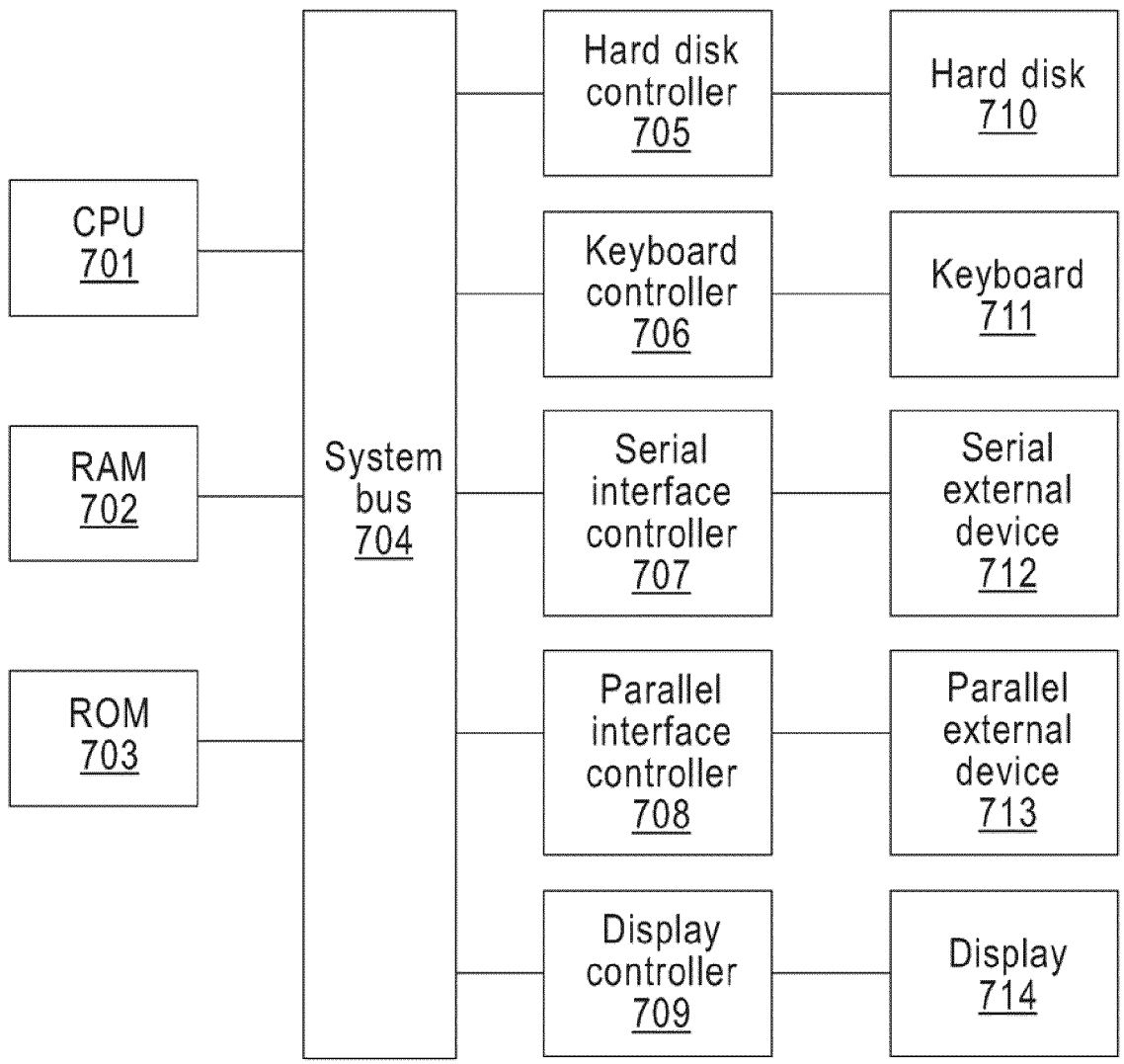
FIG. 7 illustrates a configuration block diagram of a computer system in which the present invention can be implemented.

FIG. 7 schematically illustrates a configuration block diagram of a computer system in which embodiments according to the present invention can be implemented.

The computer system as illustrated in FIG. 7 comprises: a CPU (central processing unit) 701, a RAM (random access memory) 702, a ROM (read-only memory) 703, a system bus 704, an HD (hard disc) controller 705, a keyboard controller 706, a serial interface controller 707, a parallel interface controller 708, a display controller 709, a hard disc 710, a keyboard 711, a serial peripheral device 712, a parallel peripheral device 713 and a display 714. The CPU may be either a multi-core processor or a multiprocessor in which each processor further has a single or more cores.

Among these components, connected with system bus 704 are CPU 701, RAM 702, ROM 703, HD controller 705, keyboard controller 706, serial interface controller 707, parallel interface controller 708 and display controller 709. Hard disc 710 is connected with HD controller 705, keyboard 711 is connected with keyboard controller 706, serial peripheral device 712 is connected with serial interface controller 707, parallel peripheral device 713 is connected with parallel interface controller 708, and display 714 is connected with display controller 709.

The configuration block diagram illustrated in FIG. 7 has been presented for purposes of illustration, and is not intended to limit the present invention. In some cases, a computer device in which embodiments of the present invention can be implemented may not include peripheral devices such as display 709 and keyboard 710, and the computer device may use a data server to replace the storage device such as hard disc.

The embodiments of the present invention may be implemented in software, hardware or a combination of software and hardware. The hardware part may be implemented using a dedicated logic, and the software part may be stored in a memory and be executed by a proper instruction executing system, such as a microprocessor or dedicated design hardware.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of processing Session Initiation Protocol (SIP) messages based on multiple cores, comprising:
   pre-parsing a received SIP message to obtain a single identifier of the received SIP message;
   dispatching the received SIP message to a core from a set of cores within a computer processor, the core having received a previous SIP message, the previous SIP message having a previous identifier equivalent to the identifier of the received SIP message; and
   processing on the core, after pre-parsing and dispatching the received SIP message, the received SIP message dispatched to the core, wherein processing on the core includes using related resources dedicated to the core, wherein the related resources dedicated to the core include a transaction table.

2. The method according to claim 1, wherein the identifier is one of a dialog identifier, session identifier and transaction identifier.

3. The method according to claim 1, wherein the related resources dedicated to the core further include one or more of session table, dialog table, I/O queue and timer.

4. The method according to claim 1, wherein the pre-parsing and the SIP message dispatching are implemented by a dedicated core or a core shared with the SIP message processing.

5. The method according to claim 1, wherein the pre-parsing and SIP message dispatching is implemented by a dedicated design hardware.

6. The method according to claim 5, wherein the dedicated design hardware is a Network Processor or a Transmission Control Protocol Offload Engine.

7. The method according to claim 1, wherein the core has multiple hardware threads, the SIP messages with the same identifier are dispatched to the same hardware thread of the same core, and the SIP messages dispatched to a hardware thread are processed on the hardware thread of multiple cores by using related dedicated resources allocated to the hardware thread.

8. The method according to claim 7, where the related dedicated resources allocated to the hardware thread include a transaction table.

9. An apparatus of processing Session Initiation Protocol (SIP) messages based on multiple cores, comprising:
   a computer processor;
   a core from a set of cores within the computer processor;
   a SIP message pre-parsing unit to pre-parse a received SIP message to obtain a single identifier of the received SIP message;
   a SIP message dispatching unit to dispatch the received SIP message to the core from a set of cores within the computer processor, the core having received a previous SIP message, the previous SIP message having a previous identifier equivalent to the identifier of the received SIP message; and
   a SIP message processing unit to process, by the core, the received SIP message after being pre-parsed and dispatched to the core, wherein processing by the SIP message processing unit includes using related resources dedicated to the core, wherein the related resources dedicated to the core include a transaction table.

10. The apparatus according to claim 9, wherein the identifier is one of a dialog identifier, session identifier and transaction identifier.

11. The apparatus according to claim 9, wherein the related resources dedicated to the core further include one or more of session table, dialog table, I/O queue and timer.

12. The apparatus according to claim 9, wherein the SIP message pre-parsing unit and the SIP message dispatching unit are implemented by a dedicated core or a core shared with the SIP message processing unit.

13. The apparatus according to claim 9, wherein the SIP message pre-parsing and the SIP message dispatching unit are implemented by a dedicated design hardware.

14. The apparatus according to claim 13, wherein the dedicated design hardware is a Network Processor or a Transmission Control Protocol Offload Engine.

15. The apparatus according to claim 9, wherein the core has multiple hardware threads, the SIP message dispatching unit is further configured to dispatch the SIP messages with the same identifier to the same hardware thread of the same core, and the SIP message processing unit is further configured to process, on a hardware thread of the core, the SIP messages dispatched to the hardware thread by using related dedicated resources allocated to the hardware thread.

16. The apparatus according to claim 15, where the related dedicated resources allocated to the hardware thread include a transaction table.

* * * * *